«12» United States Patent
Tanimori et al.

(10) Patent No.: US 10,928,922 B2
(45) Date of Patent: Feb. 23, 2021

(54) VEHICLE AND OPERATION METHOD OF VEHICLE

(71) Applicant: TOYOTA JIDOSHA KABUSHIKI KAISHA, Toyota (JP)

(72) Inventors: Shunsuke Tanimori, Susono (JP); Michio Ikeda, Nagoya (JP); Masaki Wasekura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/592,021

(22) Filed: Oct. 3, 2019

(65) Prior Publication Data

US 2020/0142496 A1    May 7, 2020

(30) Foreign Application Priority Data

Nov. 7, 2018  (JP) .............................. JP2018-209733

(51) Int. Cl.
| | | |
|---|---|---|
| *G06F 3/01* | (2006.01) | |
| *B60W 50/10* | (2012.01) | |
| *B60W 40/08* | (2012.01) | |
| *G01C 21/34* | (2006.01) | |
| *G05D 1/02* | (2020.01) | |
| *B62D 47/02* | (2006.01) | |

(52) U.S. Cl.
CPC ............ *G06F 3/017* (2013.01); *B60W 40/08* (2013.01); *B60W 50/10* (2013.01); *B62D 47/02* (2013.01); *G01C 21/3438* (2013.01); *G05D 1/021* (2013.01); *B60W 2040/0809* (2013.01)

(58) Field of Classification Search
CPC ...................................................... G06F 3/017
USPC ......................................................... 715/863
See application file for complete search history.

(56) References Cited

U.S. PATENT DOCUMENTS

| | | | |
|---|---|---|---|
| 10,355,875 B1* | 7/2019 | Fields ................. | H04L 12/2803 |
| 2014/0309806 A1* | 10/2014 | Ricci ..................... | G06Q 10/02 |
| | | | 701/1 |
| 2016/0167648 A1* | 6/2016 | James ...................... | G06F 3/017 |
| | | | 701/28 |
| 2017/0213165 A1* | 7/2017 | Stauffer ................ | G06Q 10/02 |
| 2018/0047295 A1* | 2/2018 | Ricci ..................... | G05D 1/0027 |
| 2018/0079427 A1* | 3/2018 | Herz ..................... | B60W 50/10 |
| 2018/0374002 A1* | 12/2018 | Li ............................. | G06F 3/017 |
| 2019/0103028 A1 | 4/2019 | Kobayashi et al. | |
| 2020/0117202 A1* | 4/2020 | Tanimori ............... | G08G 1/127 |
| 2020/0171977 A1* | 6/2020 | Jales Costa ............ | B60N 2/002 |

FOREIGN PATENT DOCUMENTS

JP       2017-182137 A    10/2017

* cited by examiner

*Primary Examiner* — William D Titcomb
(74) *Attorney, Agent, or Firm* — Sughrue Mion, PLLC (57) ABSTRACT

A vehicle configured to provide a mobility service of transporting a passenger by autonomous traveling includes a gesture detecting device configured to detect a person's gesture outside the vehicle and a service end determining unit configured to determine whether the passenger has approved of an end of the mobility service. The service end determining unit determines that the passenger has approved of the end of the mobility service when the gesture detecting device has detected a specific gesture while the vehicle is stopped.

20 Claims, 11 Drawing Sheets

VEHICLE AND OPERATION METHOD OF VEHICLE

INCORPORATION BY REFERENCE

The disclosure of Japanese Patent Application No. 2018-209733 filed on Nov. 7, 2018 including the specification, drawings and abstract is incorporated herein by reference in its entirety.

BACKGROUND

1. Technical Field

The disclosure relates to a vehicle and an operation method of a vehicle.

2. Description of Related Art

In the related art, a mobility service using a vehicle which can travel autonomously is known. An on-demand bus which operates in response to a user's request for use is described in Japanese Unexamined Patent Application Publication No. 2017-182137 (JP 2017-182137 A).

In a vehicle which can travel autonomously, there is no driver, unlike a taxi in the related art. Accordingly, it is difficult to determine when a passenger enters and exits the vehicle. In the on-demand bus described in JP 2017-182137 A, entry and exit of a passenger are detected by a beam sensor which is provided in a door of the on-demand bus.

SUMMARY

However, even when a passenger exits a vehicle, the passenger does not necessarily want to end the service immediately. For example, a fellow passenger or possessions of the passenger may remain in the vehicle. Accordingly, when an end of service is determined based only on exit of a passenger, the vehicle may depart at a time which is not wanted by a passenger who exits the vehicle. When a passenger is forced to operate a mobile terminal or the like for the purpose of confirming an end of service, a load on a passenger increases and convenience of a mobility service degrades.

Therefore, the disclosure is for accurately detecting a passenger's intention about an end of service while reducing a load on the passenger when a mobility service using a vehicle which travels autonomously is provided.

The gist of the present disclosure is as follows:

(1) A vehicle configured to provide a mobility service of transporting a passenger by autonomous traveling, the vehicle including: a gesture detecting device configured to detect a person's gesture outside the vehicle; and a service end determining unit configured to determine whether the passenger has approved of an end of the mobility service, wherein the service end determining unit determines that the passenger has approved of the end of the mobility service when the gesture detecting device has detected a specific gesture while the vehicle is stopped.

(2) The vehicle according to (1), wherein the specific gesture is set to a gesture using a leg or a head.

(3) The vehicle according to claim (1) or (2), wherein the service end determining unit is configured to determine that the passenger has approved of the end of the mobility service when the specific gesture has been detected by the gesture detecting unit after a door of the vehicle has been opened and closed.

(4) The vehicle according to claim (1) or (2), wherein the service end determining unit is configured to determine that the passenger has approved of the end of the mobility service when the specific gesture of a user who has requested use of the mobility service has been detected by the gesture detecting unit.

(5) The vehicle according to any one of (1) to (4), further including a lost article checking unit configured to inquire of the passenger about whether there is a lost article when the service end determining unit has determined that the passenger has approved of the end of the mobility service.

(6) The vehicle according to claim (5), further including an object detecting unit configured to detect a person and an object in the vehicle, wherein the lost article checking unit is configured to cause the passenger to check whether there is a lost article when the service end determining unit has determined that the passenger has approved of the end of the mobility service and the object detecting unit has detected a person or an object in the vehicle.

(7) The vehicle according to (5) or (6), wherein the lost article checking unit is configured to determine that checking of a lost article by the passenger has ended when the specific gesture has been detected by the gesture detecting unit.

(8) The vehicle according to any one of (1) to (7), further including a departure determining unit configured to permit departure of the vehicle when some of a plurality of users having requested use of the mobility service has exited the vehicle, the service ending determining unit has determined that the passenger has approved of end of the mobility service, and all the users having requested use of the mobility service and remaining in the vehicle have approved of departure of the vehicle.

(9) The vehicle according to any one of (1) to (8), wherein the service end determining unit is configured to notify the passenger of the specific gesture when the vehicle has arrived at a drop-off point or a time or a distance until the vehicle arrives at the drop-off point becomes equal to or less than a predetermined value.

(10) The vehicle according to (9), wherein the service end determining unit is configured to change the specific gesture when the passenger is notified of the specific gesture.

(11) The vehicle according to any one of (1) to (10), further including a vehicle control unit configured to control the vehicle, wherein the vehicle control unit is configured to cause the vehicle to depart when the service end determining unit has determined that the passenger has approved of the end of the mobility service.

(12) An operation method of a vehicle configured to provide a mobility service of transporting a passenger by autonomous traveling, the operation method including causing the vehicle to depart when a specific gesture of a person outside the vehicle has been detected while the vehicle is stopped.

According to the disclosure, it is possible to accurately detect a passenger's intention about an end of service while reducing a load on the passenger when a mobility service using a vehicle which travels autonomously is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle and an operation method of a vehicle according to embodiments of the disclosure will be described with reference to the accompanying drawings. In the following description, the same elements will be referred to by the same reference signs.

First Embodiment

Figure 1:
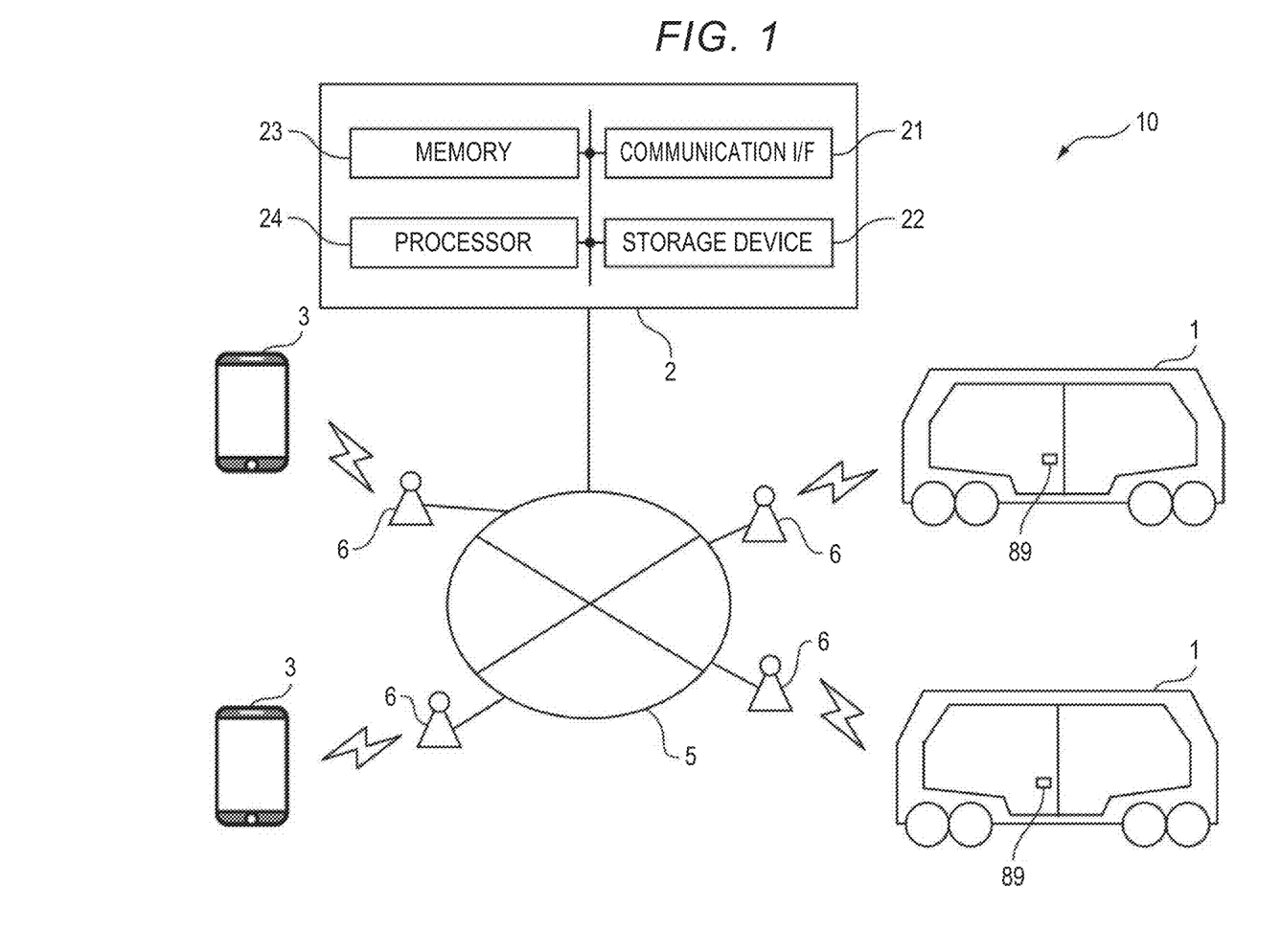
FIG. 1 is a diagram schematically illustrating a configuration of a passenger transporting system according to a first embodiment of the disclosure.

A first embodiment of the disclosure will be described below with reference to FIGS. 1 to 5. FIG. 1 is a diagram schematically illustrating a configuration of a passenger transporting system according to the first embodiment of the disclosure. The passenger transporting system 10 provides a mobility service such as a carsharing service or a ridesharing service. Specifically, the passenger transporting system 10 transports a user to a desired destination using a vehicle 1 which travels autonomously in accordance with a request for vehicle allocation from the user. In a ridesharing service, a plurality of users with destinations close to each other can simultaneously use one vehicle 1.

As illustrated in FIG. 1, the passenger transporting system 10 includes a vehicle 1, a server 2, and a mobile terminal 3. The vehicle 1, the server 2, and the mobile terminal 3 can communicate with each other.

The vehicle 1 is configured to provide a mobility service of transporting a passenger by autonomous traveling. In the mobility service, a plurality of vehicles 1 is used such that a plurality of users can use the service. The vehicle 1 is an automated-driving vehicle that travels autonomously and does not require a driver who operates the vehicle 1. The vehicle 1 is managed by a service provider who provides the mobility service.

Figure 2:
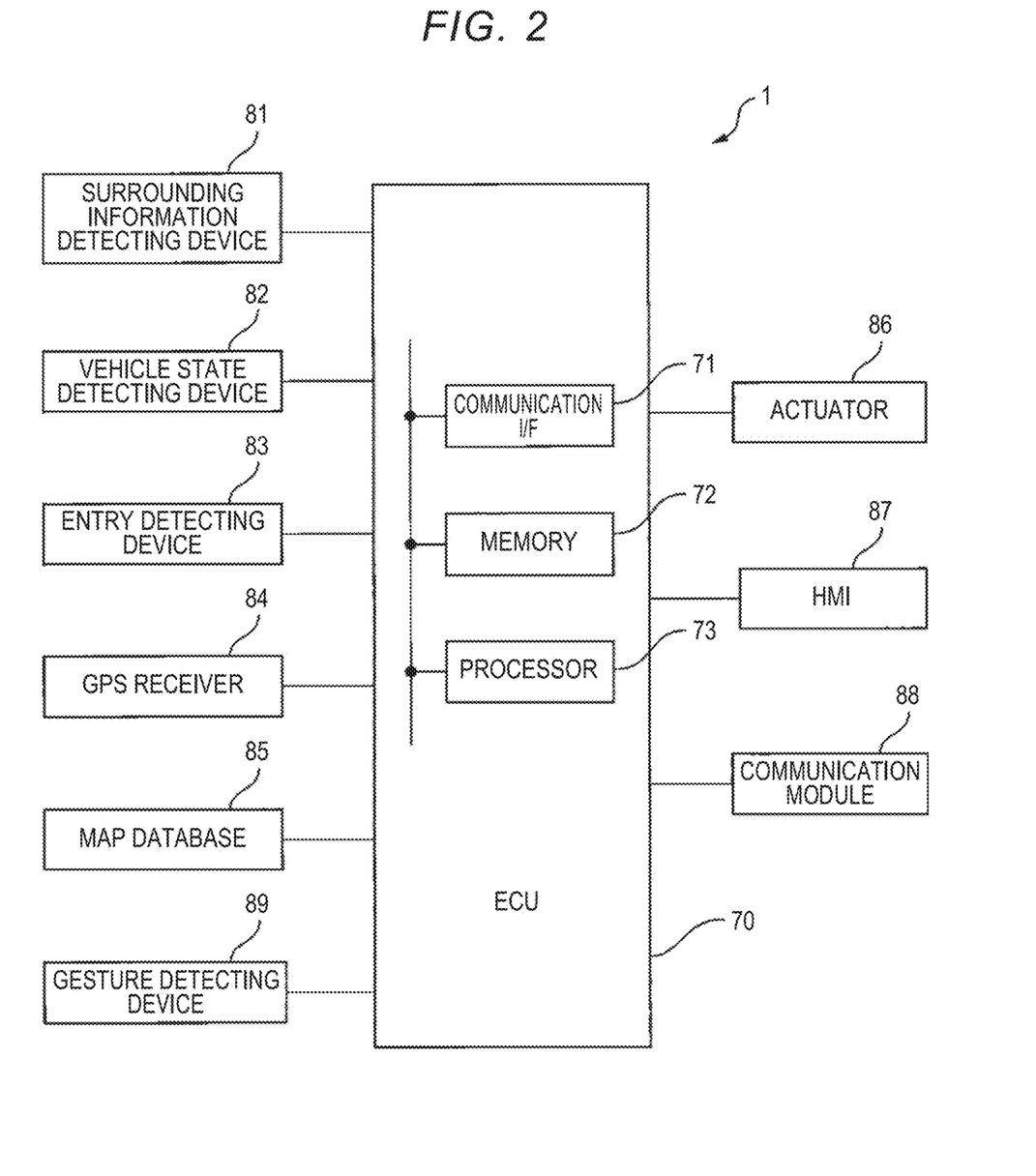
FIG. 2 is a diagram schematically illustrating a configuration of a vehicle according to the first embodiment.

FIG. 2 is a diagram schematically illustrating a configuration of a vehicle 1 according to the first embodiment. The vehicle 1 includes an electronic control unit (ECU) 70. The ECU 70 includes a communication interface 71, a memory 72, and a processor 73 and executes various types of control of the vehicle 1. The communication interface 71 and the memory 72 are connected to the processor 73 via signal lines. In this embodiment, a single ECU 70 is provided, but a plurality of ECUs may be provided for each function.

The communication interface 71 includes an interface circuit that connects the ECU 70 to an onboard network based on the standard of controller area network (CAN). The ECU 70 communicates with another onboard device via the communication interface 71.

The memory 72 includes, for example, a volatile semiconductor memory (for example, a RAM) and a nonvolatile semiconductor memory (for example, a ROM). The memory 72 stores programs which are executed by the processor 73 and various types of data which are used for the processor 73 to perform various processes.

The processor 73 includes one or more central processing units (CPUs) and peripheral circuits thereof and performs various processes. The processor 73 may further include an arithmetic operation circuit such as a logical operation unit or a numerical operation unit.

The vehicle 1 includes a surrounding information detecting device 81. The surrounding information detecting device 81 detects surrounding information around the vehicle 1 for autonomous traveling of the vehicle 1. The surrounding information includes information of white lines of a road, other vehicles, pedestrians, bicycles, buildings, marks, signals, obstacles, and the like. The surrounding information detecting device 81 is connected to the ECU 70 via an onboard network and an output of the surrounding information detecting device 81 is transmitted to the ECU 70. For example, the surrounding information detecting device 81 includes an outside camera, a millimeter wave radar, a laser imaging detection and ranging (LIDAR), and an ultrasonic sensor. The outside camera images the outside of the vehicle 1 and generates a surrounding image.

The vehicle 1 further includes a vehicle state detecting device 82. The vehicle state detecting device 82 detects a state of the vehicle 1 for autonomous traveling of the vehicle 1. The vehicle state detecting device 82 is connected to the ECU 70 via the onboard network and an output of the vehicle state detecting device 82 is transmitted to the ECU 70. For example, the vehicle state detecting device 82 includes a vehicle speed sensor, a yaw rate sensor, and a door opening/closing sensor. The vehicle speed sensor detects a speed of the vehicle 1. The yaw rate sensor detects a yaw rate which is a rotation speed around a vertical axis passing through the center of gravity of the vehicle 1. The door opening/closing sensor detects opening/closing of a door of the vehicle 1.

The vehicle 1 includes an entry detecting device 83. The entry detecting device 83 detects a passenger who enters the vehicle 1. The entry detecting device 83 is connected to the ECU 70 via the onboard network and an output of the entry detecting device 83 is transmitted to the ECU 70. For example, the entry detecting device 83 includes a beam sensor, a seat belt sensor, a seating sensor, and an information reader. The beam sensor is disposed in the vicinity of a door of the vehicle 1 and detects an object which passes through the door. The seat belt sensor detects whether a passenger wears a seat belt. The seating sensor detects whether a passenger sits on a seat. The seat belt sensor and the seating sensor are provided for each seat. The information reader reads identification information of the mobile terminal 3, a QR code (registered trademark) or a password which is transmitted to a user as vehicle allocation information, card information of a usage card for using the mobility service, and the like. The information reader is disposed in the vicinity of a door of the vehicle 1 and is provided for each seat. The entry detecting device 83 may also serve as an exit detecting device that detects a passenger who exits the vehicle 1.

The vehicle 1 includes a GPS receiver 84. The GPS receiver 84 receives signals from three or more GPS satellites and detects a current position of the vehicle 1 (for example, the latitude and longitude of the vehicle 1). The GPS receiver 84 is connected to the ECU 70 via the onboard network and an output of the GPS receiver 84 is transmitted to the ECU 70.

The vehicle 1 includes a map database 85. The map database 85 includes map information. The map database 85 is connected to the ECU 70 via the onboard network and the ECU 70 acquires map information from the map database 85. The map information stored in the map database 85 is updated with data received from the outside of the vehicle 1, a simultaneous localization and mapping (SLAM) technique, or the like.

The vehicle 1 includes an actuator 86. The actuator 86 causes the vehicle 1 to operate. The actuator 86 is connected to the ECU 70 via the onboard network and the ECU 70 controls the actuator 86. For example, the actuator 86 includes a driving device (at least one of an engine and a motor) for accelerating the vehicle 1, a brake actuator for braking the vehicle 1, and a steering motor for steering the vehicle 1.

The vehicle 1 includes a human-machine interface (HMI) 87. The HMI 87 is an interface for performing input and output of information between a passenger and the vehicle 1. The HMI 87 includes, for example, a display that displays information, a speaker that generates sound, operation buttons or a touch screen used for a passenger to perform an input operation, and a microphone that receives voice of a passenger. The HMI 87 is connected to the ECU 70 via the onboard network, an output of the ECU 70 is delivered to a passenger via the HMI 87, and input information from a passenger is input to the ECU 70 via the HMI 87.

The vehicle 1 includes a communication module 88. The communication module 88 is a device that enables communication between the vehicle 1 and the outside of the vehicle 1. The communication module 88 includes, for example, a data communication module (DCM) and a short-range radio communication module (for example, a WiFi module or a Bluetooth (registered trademark) module). The data communication module communicates with the server 2 via a radio base station 6 and a communication network 5. The short-range radio communication module communicates directly with the mobile terminal 3.

The server 2 is provided outside the vehicle 1 and manages a user and the vehicle 1 to efficiently provide the mobility service. Specifically, the server 2 performs registration of user information, matching between a user and a vehicle 1, creation of a traveling plan, settlement of a usage fee, and the like. The server 2 is managed by a service provider who provides the mobility service.

As illustrated in FIG. 1, the server 2 includes a communication interface 21, a storage device 22, a memory 23, and a processor 24. The communication interface 21, the storage device 22, and the memory 23 are connected to the processor 24 via signal lines. The server 2 may further include an input device such as a keyboard and a mouse and an output device such as a display. The server 2 may be constituted by a plurality of computers.

The communication interface 21 includes an interface circuit that connects the server 2 to the communication network 5. The server 2 communicates with the vehicle 1 and the mobile terminal 3 via the communication interface 21.

The storage device 22 includes, for example, a hard disk drive (HDD), a solid state drive (SSD), or an optical recording medium. The storage device 22 stores various types of data and stores, for example, user information, vehicle information, map information, and computer programs which are used for the processor 24 to perform various processes. The computer programs may be recorded on a recording medium such as an optical recording medium or a magnetic recording medium and distributed.

The memory 23 includes, for example, a semiconductor memory such as a RAM. The memory 23 stores, for example, various types of data which are used for the processor 24 to perform various processes.

The processor 24 includes one or more CPUs and peripheral circuits thereof and performs various processes. The processor 24 may further include an arithmetic operation circuit such as a logical operation unit or a numerical operation unit.

The mobile terminal 3 is carried by a user and can move along with the user. The mobile terminal 3 is a device that communicates with the server 2 via a radio base station 6 and the communication network 5. The mobile terminal 3 includes an input device such as a touch panel and a microphone and an output device such as a display and a speaker. Examples of the mobile terminal 3 include a smartphone, a tablet terminal, and a personal computer.

Figure 3:
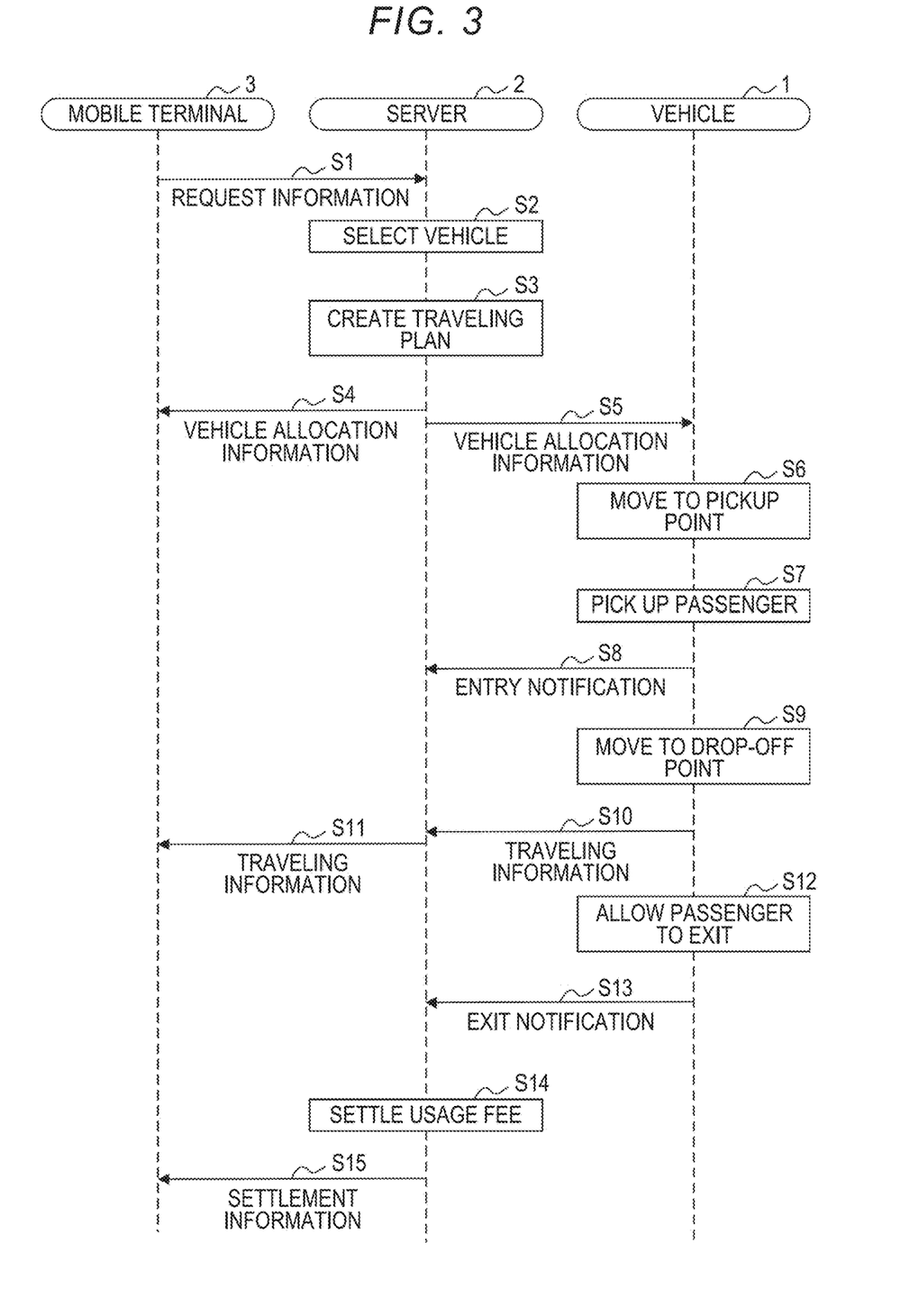
FIG. 3 is a sequence diagram illustrating an example of an operation of the passenger transporting system.

A process flow of a mobility service will be described below in brief with reference to FIG. 3. FIG. 3 is a sequence diagram illustrating an example of an operation of the passenger transporting system 10. In the sequence diagram, communication between the server 2 and the mobile terminal 3 and communication between the server 2 and the vehicle 1 are carried out via the communication network 5.

A user who uses the mobility service registers user information in advance using the mobile terminal 3 or the like. The registered user information is stored in the storage device 22 of the server 2 for each user. When a user requests use of the mobility service, that is, when a user requests preparation of a vehicle 1, the user operates the mobile terminal 3 and inputs request information to the mobile terminal 3. Inputting of request information is performed, for example, over an application for the mobility service which is installed in the mobile terminal 3.

When request information is input to the mobile terminal 3, the mobile terminal 3 transmits the request information to the server 2 (Step S1). The request information includes a pickup point, a drop-off point, user identification information (for example, a registration number of a user), fellow passenger information (such as the number of occupants), and information on whether sharing a vehicle with another user is permitted. The pickup point refers to a desired entry position of a user. The drop-off point refers to a desired exit position of a user.

When request information is received from a user via the mobile terminal 3, the server 2 selects a vehicle 1 which is suitable for transportation of the user (Step S2). That is, the server 2 performs matching between a user and a vehicle 1. The vehicle 1 which is suitable for transportation of a user is, for example, a standby vehicle 1 which is close to the pickup point. When a user permits sharing a vehicle with another user, a vehicle 1 which is used by another user may be selected.

The server 2 creates a traveling plan for transportation of the user (Step S3). The traveling plan includes a scheduled arrival time at the pickup point, a traveling route to the drop-off point, and a scheduled arrival time at a destination.

Subsequently, the server 2 transmits vehicle allocation information to the mobile terminal 3 (Step S4). Vehicle allocation information which is transmitted to the mobile terminal 3 includes a scheduled arrival time at the pickup point, a traveling route to the drop-off point, a scheduled arrival time at the drop-off point, identification information of the vehicle 1 (such as a number of a number plate, a vehicle model, and a vehicle color), and information on whether sharing a vehicle with another user is permitted. The server 2 transmits vehicle allocation information to the vehicle 1 (Step S5). The vehicle allocation information which is transmitted to the vehicle 1 includes a pickup point, a drop-off point, a traveling route to the drop-off point, and user identification information.

When vehicle allocation information is received from the server 2, the vehicle 1 starts movement to a pickup point (Step S6). Thereafter, when the vehicle 1 arrives at the pickup point, the vehicle 1 picks up a passenger (a user or a user and a fellow passenger thereof) (Step S7).

After a passenger has entered the vehicle 1, the vehicle 1 notifies the server 2 that the passenger has entered the vehicle 1. Specifically, the vehicle 1 transmits an entry notification to the server 2 (Step S8). After the passenger has entered the vehicle 1, the vehicle 1 starts movement to a drop-off point (Step S9).

While moving to the drop-off point, the vehicle 1 transmits traveling information to the server 2 at predetermined intervals (Step S10). The traveling information which is transmitted to the server 2 includes a current position of the vehicle 1 and surrounding information of the vehicle 1. The server 2 transmits traveling information to the mobile terminal 3 at predetermined intervals while moving the to the drop-off point (Step S11). The traveling information which is transmitted to the mobile terminal 3 includes a current position of the vehicle 1, a scheduled arrival time at the drop-off point, and congestion information of a traveling route.

Thereafter, when the vehicle 1 arrives as the drop-off point, the vehicle 1 allows the passenger to exit the vehicle 1 (Step S12). After the passenger has exited the vehicle 1, the vehicle 1 notifies the server 2 that the passenger has exited. Specifically, the vehicle 1 transmits an exit notification to the server 2 (Step S13).

The server 2 settles a usage fee of the mobility service after the passenger has exited (Step S14). For example, the server 2 settles a usage fee by account-to-account transfer or credit card payment based on user information stored in the storage device 22 of the server 2. After the usage fee has been settled, the vehicle 1 transmits settlement information including settlement details to the mobile terminal 3 (Step S15).

When the above-mentioned service ends, the vehicle 1 is on standby for transportation of a next user or moves to a pickup point for a next user. That is, the vehicle 1 leaves the drop-off point after the passenger has exited the vehicle 1.

In the vehicle 1, there is no driver in the vehicle 1 unlike a taxi in the related art. Accordingly, in order to cause the vehicle 1 to leave the drop-off point, it is necessary to ascertain an intention of ending the service of the passenger who has exited the vehicle 1. However, when a passenger is forced to operate the mobile terminal 3 or the like for ascertainment of the end of service, a load on the passenger increases. Therefore, in this embodiment, a passenger's intention of ending the service is ascertained by detecting a specific gesture of a person outside the vehicle 1 while the vehicle 1 is stopped.

Figure 4:
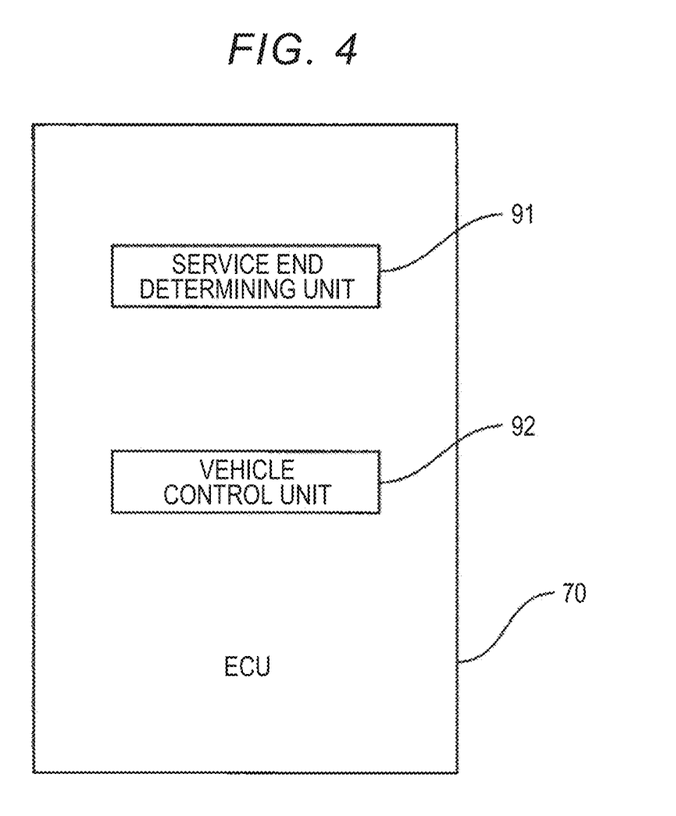
FIG. 4 is a functional block diagram of an ECU of the vehicle according to the first embodiment.

FIG. 4 is a functional block diagram illustrating the ECU 70 of the vehicle 1 according to the first embodiment. In this embodiment, the ECU 70 includes a service end determining unit 91 and a vehicle control unit 92. The service end determining unit 91 and the vehicle control unit 92 are functional blocks which are embodied by causing the processor 73 of the ECU 70 to execute a program stored in the memory 72 of the ECU 70.

The service end determining unit 91 determines whether a passenger of the vehicle 1 has approved of end of the mobility service. The vehicle control unit 92 controls the vehicle 1 using the actuator 86. When a passenger exits the vehicle at a drop-off point, the vehicle control unit 92 controls the vehicle 1 based on the determination result from the service end determining unit 91.

As illustrated in FIGS. 1 and 2, the vehicle 1 further includes a gesture detecting device 89. The gesture detecting device 89 detects a person's gesture outside the vehicle 1. The gesture detecting device 89 is connected to the ECU 70 via the onboard network and an output of the gesture detecting device 89 is transmitted to the ECU 70. The gesture detecting device 89 is disposed outside the vehicle 1. For example, as illustrated in FIG. 1, the gesture detecting device 89 is disposed outside the door of the vehicle 1 for entry and exit of a passenger.

The gesture detecting device 89 is constituted by, for example, a camera that images the surroundings and generates an image. In this case, the gesture detecting device 89 may be disposed inside the vehicle 1 as long as it can images the outside of the vehicle 1. The gesture detecting device 89 may be a motion sensor that detects a predetermined motion of a leg, or the like.

In this embodiment, when a specific gesture has been detected by the gesture detecting device 89 while the vehicle 1 is stopped, the service end determining unit 91 determines that a passenger of the vehicle 1 has approved of end of the mobility service. Accordingly, a passenger who has exited the vehicle 1 can express an intention of ending the service without requiring any operation of the mobile terminal 3. A passenger who has exited the vehicle 1 can express an intention of ending the service without touching the vehicle 1 (such as an operation button of the HMI 87). Accordingly, it is possible to reduce a load on a passenger. By detecting a specific gesture in which a passenger's intention of ending the service is reflected, it is possible to accurately detect a passenger's intention of ending the service.

Service Ending Process

Figure 5:
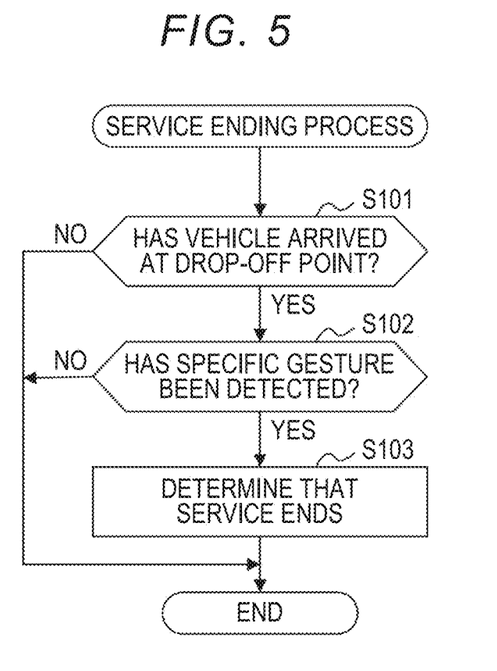
FIG. 5 is a flowchart illustrating a control routine of a service ending process according to the first embodiment.

The above-mentioned control will be described below in detail with reference to FIG. 5. FIG. 5 is a flowchart illustrating a control routine of a service ending process according to the first embodiment. This control routine is repeatedly performed at predetermined intervals by the ECU 70.

First, in Step S101, the service end determining unit 91 determines whether the vehicle 1 has arrived at a drop-off point. Information on the drop-off point is included in vehicle allocation information which is transmitted to the vehicle 1. For example, when the current position of the vehicle 1 detected by the GPS receiver 84 is close to the drop-off point and the vehicle speed detected by the vehicle state detecting device 82 is zero, the service end determining unit 91 determines that the vehicle 1 has arrived at the drop-off point.

When it is determined in Step S101 that the vehicle 1 has not arrived at the drop-off point, the control routine ends. On the other hand, when it is determined in Step S101 that the vehicle 1 has arrived at the drop-off point, the control routine progresses to Step S102.

In Step S102, the service end determining unit 91 determines whether a person's specific gesture outside the vehicle 1 has been detected by the gesture detecting device 89. The specific gesture is determined in advance and is known to a user of the mobility service. The specific gesture is set to a gesture which is different a motion when a passenger exits the vehicle 1 such that approval of the end of service is distinguished from simple exit.

Preferably, the specific gesture is set to a gesture which is also different from a general motion of a person on a sidewalk. Accordingly, it is possible to prevent erroneous determination of the end of service due to a motion of a person (such as a pedestrian) other than a passenger of the vehicle 1. For example, the specific gesture is set to a gesture of holding a hand up to the gesture detecting device 89, a gesture of shaking both hands, or a gesture of swinging an arm. Preferably, the specific gesture is set to a gesture using a leg or a head. Accordingly, even when both hands of a passenger are occupied by baggage or the like, the passenger can express an intention of ending the service by making the specific gesture. For example, the specific gesture is set to a gesture of moving a leg aside, a gesture of putting a leg below the door of the vehicle 1, or a gesture of moving a head upward and downward a plurality of times.

When it is determined in Step S102 that the gesture detecting device 89 has not detected the specific gesture, the control routine ends. On the other hand, when it is determined in Step S102 that the gesture detecting device 89 has detected the specific gesture, the control routine progresses to Step S103.

In Step S103, the service end determining unit 91 determines that the passenger of the vehicle 1 has approved of end of the mobility service. Thereafter, the vehicle control unit 92 causes the vehicle 1 to depart from the drop-off point. After Step S103, the control routine ends.

When the specific gesture has been detected by the gesture detecting device 89 after the door of the vehicle 1 has been opened and closed, the service end determining unit 91 may determine that the passenger of the vehicle 1 has approved of end of the mobility service. Accordingly, since the likelihood that the specific gesture detected by the gesture detecting device 89 while the vehicle 1 is stopped would have been performed by the passenger having exited from the vehicle 1 increases, it is possible to further enhance detection accuracy of an intention of ending the service. In this case, the service end determining unit 91 detects opening and closing of the door of the vehicle 1 using the vehicle state detecting device 82 (specifically, a door opening/closing sensor).

Since a driver is not present in the vehicle 1, a user having requested use of the mobility service (hereinafter referred to as a "requester") is a substantial manager of the vehicle 1. Accordingly, when the specific gesture of the requester has been detected by the gesture detecting device 89, the service end determining unit 91 may determine that the passenger of the vehicle 1 has approved of end of the mobility service. Accordingly, it is possible to more reliably detect an intention of ending the service. In this case, for example, the service end determining unit 91 identifies a person who makes the specific gesture in a combination of a face image generated by the gesture detecting device 89 and a face image of the requester stored in the server 2 or by radio communication between the vehicle 1 and the mobile terminal 3 of the requester.

When the vehicle 1 has arrived at the drop-off point or when a time or a distance until the vehicle 1 arrives at the drop-off point is equal to or less than a predetermined value, the service end determining unit 91 may notify the passenger of the vehicle 1 of a specific gesture via the HMI 87 or the mobile terminal 3. Accordingly, the passenger of the vehicle 1 can easily make the specific gesture after the passenger has exited the vehicle 1. In this case, the service end determining unit 91 may change the specific gesture whenever the passenger is notified of the specific gesture. That is, the service end determining unit 91 may change the specific gesture whenever a passenger exits the vehicle at the drop-off point. Accordingly, since a person (such as a pedestrian) other than a passenger of the vehicle 1 has a difficulty in predicting the specific gesture, it is possible to prevent erroneous determination of the end of service due to a wrong act of a person other than the passenger of the vehicle 1.

Second Embodiment

A configuration and control of a vehicle according to a second embodiment are basically the same as in the vehicle according to the first embodiment except for the following points. Accordingly, the second embodiment of the disclosure will be described below with a focus on details different from the first embodiment.

Figure 6:
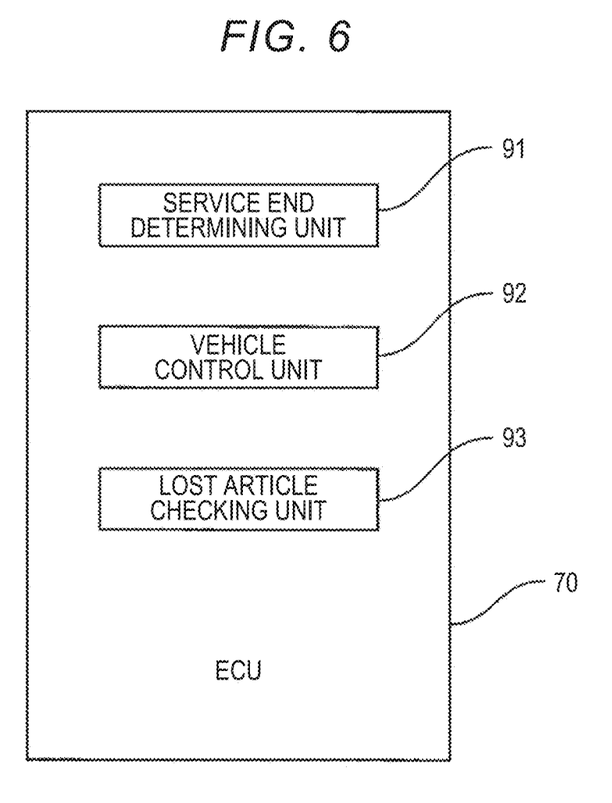
FIG. 6 is a functional block diagram of an ECU of the vehicle according to a second embodiment.

FIG. 6 is a functional block diagram of an ECU 70 of a vehicle 1 according to a second embodiment. In the second embodiment, the ECU 70 further includes a lost article checking unit 93 in addition to the service end determining unit 91 and the vehicle control unit 92. The service end determining unit 91, the vehicle control unit 92, and the lost article checking unit 93 are functional blocks by causing the processor 73 of the ECU 70 to execute a program stored in the memory 72 of the ECU 70.

Although a passenger of the vehicle 1 has expressed an intention of ending the service, a fellow passenger or possessions (a mobile terminal 3, an umbrella, a wallet, a pet, or the like) of the passenger may remain in the vehicle 1. Accordingly, in the second embodiment, when the service end determining unit 91 has determined that the passenger of the vehicle 1 has approved of end of the mobility service, the lost article checking unit 93 inquires of the passenger of the vehicle 1 about whether there is a lost article. Accordingly, it is possible to prevent the vehicle 1 from departing in a state in which a fellow passenger or possessions of the passenger remains in the vehicle 1.

Service Ending Process

Figure 7:
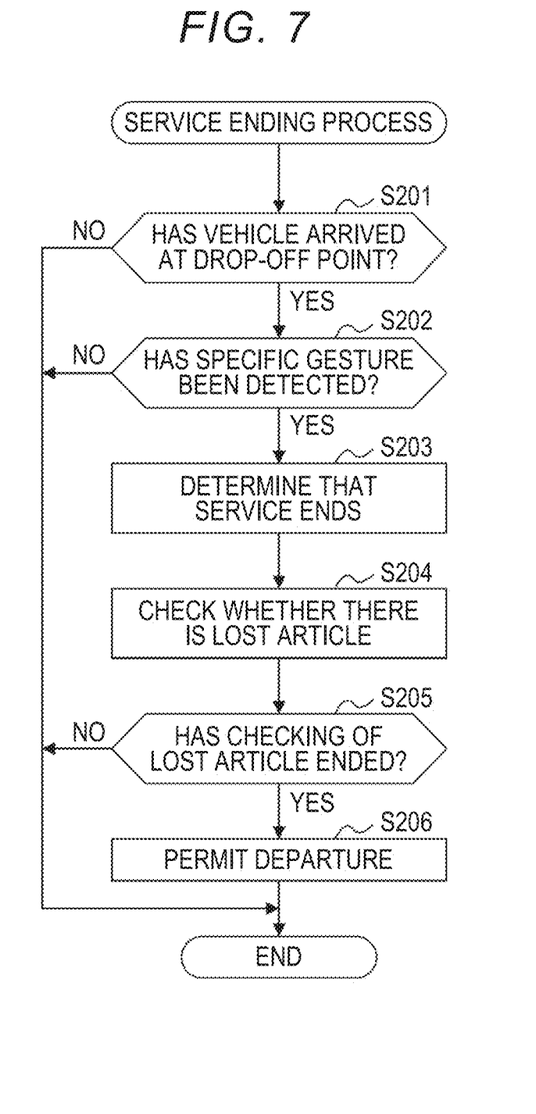
FIG. 7 is a flowchart illustrating a control routine of a service ending process according to the second embodiment.

FIG. 7 is a flowchart illustrating a control routine of a service ending process according to the second embodiment. This control routine is repeatedly performed at predetermined intervals by the ECU 70. Steps S201 to S203 are the same as Steps S101 to S103 in FIG. 5 and thus description thereof will not be repeated.

After it is determined in Step S203 that the passenger of the vehicle 1 has approved of end of the mobility service, the control routine progresses to Step S204. In Step S204, the lost article checking unit 93 inquires of the passenger of the vehicle 1 about whether there is a lost article. For example, the lost article checking unit 93 displays a message for checking whether there is a lost article on the HMI 87 disposed outside the door of the vehicle 1. The lost article checking unit 93 may notify the passenger of the vehicle 1 of a message for checking whether there is a lost article by voice using the speaker or the like of the HMI 87. The lost article checking unit 93 may display a message for checking whether there is a lost article on the mobile terminal 3 of the passenger by radio communication between the vehicle 1 and the mobile terminal 3 of the passenger. An example of the message for checking whether there is a lost article is "is there no lost article?"

Subsequently, in Step S205, the lost article checking unit 93 determines whether checking of a lost article by the passenger of the vehicle 1 has ended. For example, when an input operation indicating that checking of a lost article has ended to the HMI 87 or the mobile terminal 3 (such as a button operation or a voice input) has been performed, the lost article checking unit 93 determines that checking of a lost article by the passenger of the vehicle 1 has ended. When the specific gesture has been detected by the gesture detecting device 89, the lost article checking unit 93 may determine that checking of a lost article by the passenger of the vehicle 1 has ended. Accordingly, since the passenger has only to repeat the same gesture two times to completely end the service, it is possible to reduce a load on the passenger.

When it is determined in Step S205 that checking of a lost article has not ended, the control routine ends. On the other hand, when it is determined in Step S205 that checking of a lost article has ended, the control routine progresses to Step s206. In Step S206, the lost article checking unit 93 permits departure of the vehicle 1. Thereafter, the vehicle control unit 92 causes the vehicle 1 to depart from the drop-off point. After Step S206, the control routine ends.

The control routine illustrated in FIG. 7 can be modified in the same way as in the control routine illustrated in FIG. 5.

Third Embodiment

A configuration and control of a vehicle according to a third embodiment are basically the same as in the vehicle according to the second embodiment except for the following points. Accordingly, the third embodiment of the disclosure will be described below with a focus on details different from the second embodiment.

Figure 8:
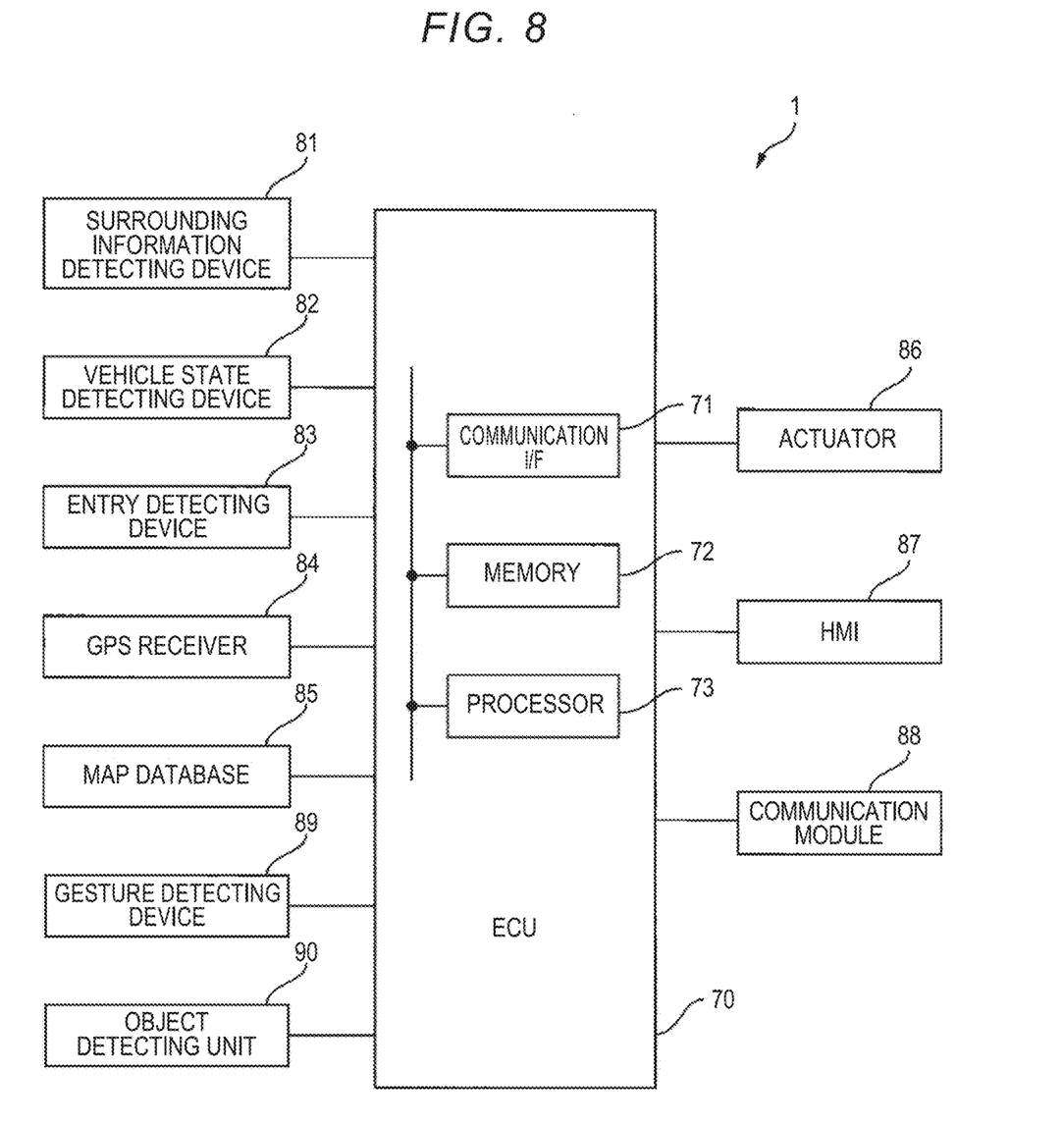
FIG. 8 is a diagram schematically illustrating a configuration of a vehicle according to a third embodiment.

FIG. 8 is a functional block diagram of a vehicle 1 according to the third embodiment. In the third embodiment, the vehicle 1 further includes an object detecting device 90. The object detecting device 90 detects a person and an object in the vehicle 1. The object detecting device 90 is connected to the ECU 70 via the onboard network and an output of the object detecting device 90 is transmitted to the ECU 70.

For example, the object detecting device 90 includes an interior camera and a weight sensor. The interior camera images the inside of the vehicle 1 and generates an interior image. For example, the interior camera is disposed on the ceiling or the like of the vehicle 1. The interior camera may include a plurality of cameras which is disposed at different positions of the vehicle 1 (for example, a cabin and a trunk room). The weight sensor is disposed in each seat of the vehicle 1 and detects a weight of an object on the corresponding seat. The weight sensor may be disposed in the trunk room of the vehicle 1 and detect a weight of an object in the trunk room.

In the third embodiment, when the service end determining unit 91 determines that a passenger of the vehicle 1 has approved of end of the mobility service and the object detecting device 90 has detected a person or an object in the vehicle 1, the lost article checking unit 93 inquires of the passenger about whether there is a lost article. In this case, only when there is a high likelihood that a fellow passenger or possessions of the passenger will remain in the vehicle 1, it is checked whether there is a lost article. Accordingly, it is possible to reduce a load on a passenger for completely ending the service.

Service Ending Process

Figure 9:
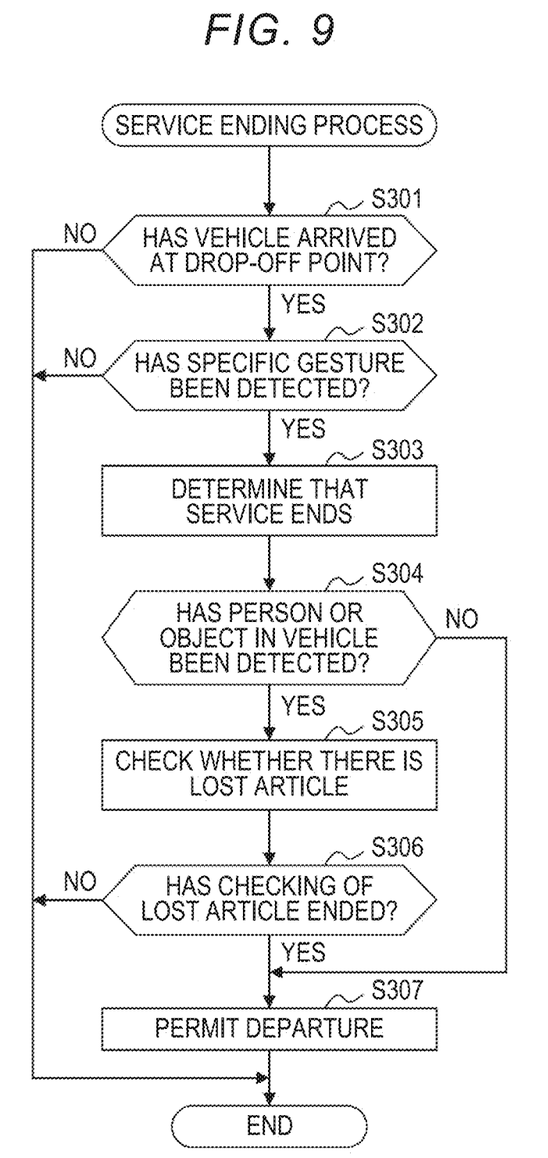
FIG. 9 is a flowchart illustrating a control routine of a service ending process according to the third embodiment.

FIG. 9 is a flowchart illustrating a control routine of a service ending process according to the third embodiment. This control routine is repeatedly performed at predetermined intervals by the ECU 70. Steps S301 to S303 are the same as Steps S101 to S103 in FIG. 5 and thus description thereof will not be repeated.

When it is determined in Step S303 that a passenger of the vehicle 1 has approved of end of the mobility service, the control routine progresses to Step S304. In Step S304, the lost article checking unit 93 determines whether the object detecting device 90 has detected a person or an object in the vehicle 1. When it is determined that the object detecting device 90 has detected a person or an object in the vehicle 1, the control routine progresses to Step S305.

In Step S305, similarly to Step S204 of FIG. 7, the lost article checking unit 93 inquires the passenger of the vehicle 1 about whether there is a lost article. When an interior image is generated by the object detecting device 90, the lost article checking unit 93 may display the interior image on the HMI 87 or the mobile terminal 3 of the passenger along with a message for inquiring about whether there is a lost article. Accordingly, the passenger can rapidly check whether there is a lost article.

Subsequently, in Step S306, similarly to Step S205 in FIG. 7, the lost article checking unit 93 determines whether checking of a lost article by the passenger of the vehicle 1 has ended. When it is determined that checking of a lost article has not ended, the control routine ends. On the other hand, when checking of a lost article has ended, the control routine progresses to Step S307.

When it is determined in Step S304 that the object detecting device 90 has not detected a person or an object in the vehicle 1, the control routine skips Steps S305 and S306 and progresses to Step S307. In Step S307, the lost article checking unit 93 permits departure of the vehicle 1. Thereafter, the vehicle control unit 92 causes the vehicle 1 to depart from the drop-off point. After Step S307, the control routine ends.

The control routine illustrated in FIG. 9 can be modified in the same way as in the control routine illustrated in FIG. 5.

Fourth Embodiment

A configuration and control of a vehicle according to a fourth embodiment are basically the same as in the vehicle according to the first embodiment except for the following points. Accordingly, the fourth embodiment of the disclosure will be described below with a focus on details different from the first embodiment.

Figure 10:
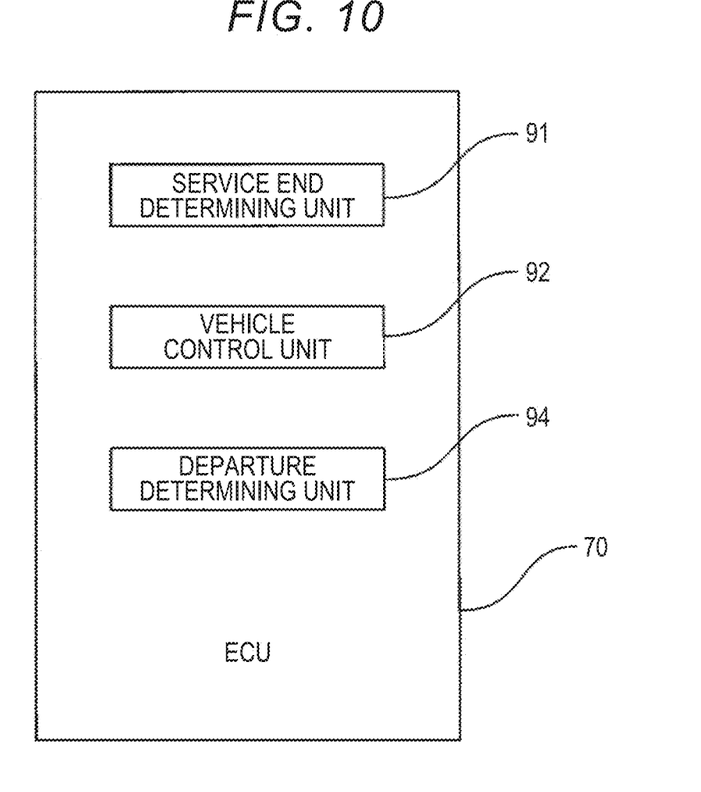
FIG. 10 is a functional block diagram of an ECU of a vehicle according to a fourth embodiment.

FIG. 10 is a functional block diagram of an ECU 70 of a vehicle 1 according to the fourth embodiment. In the fourth embodiment, the ECU 70 includes a departure determining unit 94 in addition to the service end determining unit 91 and the vehicle control unit 92. The service end determining unit 91, the vehicle control unit 92, and the departure determining unit 94 are functional blocks by causing the processor 73 of the ECU 70 to execute a program stored in the memory 72 of the ECU 70.

The departure determining unit 94 determines whether the vehicle 1 is to depart. In the mobility service (specifically, a ridesharing service), a plurality of requesters with different drop-off points may be present in the vehicle 1. In this case, a time at which a requester who first exits the vehicle 1 approves of end of the mobility service and a time at which a requester remaining in the vehicle 1 desires departure of the vehicle 1 may not match each other. For example, a requester remaining in the vehicle 1 may move to another seat and then desire departure of the vehicle 1.

Although the requester remaining in the vehicle 1 has a fellow passenger, the requester is a substantial manager of the vehicle 1. Accordingly, in a case where some of a plurality of requesters exits the vehicle 1, that is, in a case where some of a plurality of requesters remain in the vehicle 1, the departure determining unit 94 permits departure of the vehicle 1 when the service end determining unit 91 has determined that the passenger of the vehicle 1 has approved of end of the mobility service and all the requesters remaining in the vehicle 1 have approved of departure of the vehicle 1. Accordingly, the vehicle 1 can be made to depart at a time at which desires of both a passenger having exited the vehicle 1 and a passenger remaining in the vehicle 1 are considered. As a result, it is possible to secure safety of passengers.

Service Ending Process

Figure 11:
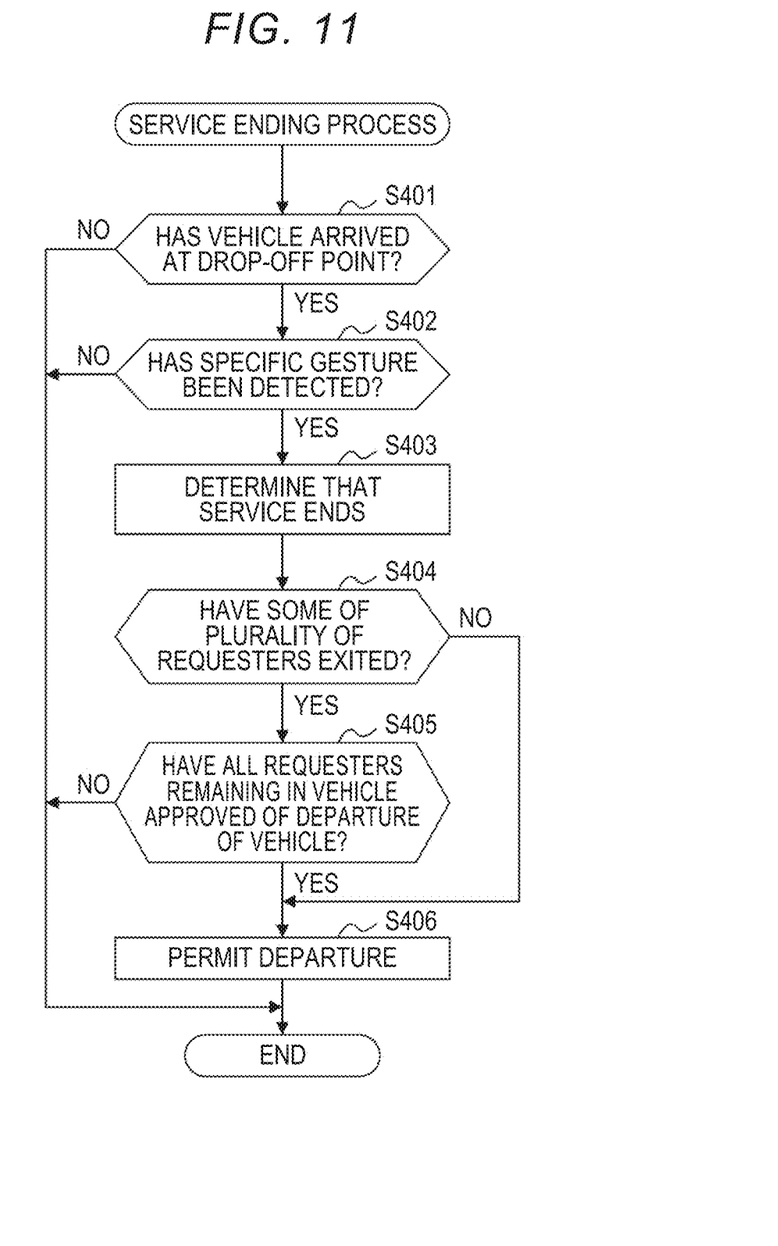
FIG. 11 is a flowchart illustrating a control routine of a service ending process according to the fourth embodiment.

FIG. 11 is a flowchart illustrating a control routine of a service ending process according to the fourth embodiment. This control routine is repeatedly performed at predetermined intervals by the ECU 70. Steps S401 to S403 are the same as Steps S101 to S103 in FIG. 5 and thus description thereof will not be repeated.

After it is determined in Step S403 that a passenger of the vehicle 1 has approved of end of the mobility service, the control routine progresses to Step S404. In Step S404, the departure determining unit 94 determines whether some of a plurality of requesters exits the vehicle 1. When drop-off points of a plurality of requesters in the vehicle 1 are different from each other, the departure determining unit 94 determines that some of the plurality of requesters exits the vehicle 1. Information on the drop-off points of the requesters is included in vehicle allocation information which is transmitted to the vehicle 1.

When it is determined in Step S404 that some of the plurality of requesters exits the vehicle 1, the control routine progresses to Step S405. In Step S405, the departure determining unit 94 determines whether all the requesters remaining in the vehicle 1 have approved of departure of the vehicle 1. The requesters remaining in the vehicle 1 approve of departure of the vehicle 1 via the mobile terminals 3 or the HMI 87 when they desire departure of the vehicle 1. When departure of the vehicle 1 has been approved of via the mobile terminals 3, approval information is transmitted from the mobile terminals 3 to the ECU 70 directly or via the server 2. When departure of the vehicle 1 has been approved of via the HMI 87, approval information is transmitted from the HMI 87 to the ECU 70.

When it is determined in Step S405 that at least a part of the requesters remaining in the vehicle 1 has not approved of departure of the vehicle 1, the control routine ends. On the other hand, when it is determined in Step S405 that all the requesters remaining in in the vehicle 1 have approved of departure of the vehicle 1, the control routine progresses to Step S406. When it is determined in Step S404 that all the requesters exit the vehicle 1, the control routine skips Step S405 and progresses to Step S406.

In Step S406, the departure determining unit 94 permits departure of the vehicle 1. Thereafter, the vehicle control unit 92 causes the vehicle 1 to depart from the drop-off point. After Step S406, the control routine ends.

The control routine illustrated in FIG. 11 can be modified in the same way as the control routine illustrated in FIG. 5.

While exemplary embodiments of the disclosure have been described above, the disclosure is not limited to the embodiments and can be modified and changed in various forms without departing from the details described in the appended claims.

For example, the vehicle 1 may be used by only one specific user. In this case, matching between a user and a vehicle 1 is not performed. The vehicle 1 may be owned by a user instead of a service provider that provides a mobility service. In this case, matching between a user and a vehicle 1 and settlement of a usage fee are not performed.

When a distance between a passenger having exited the vehicle 1 and the vehicle 1 becomes equal to or greater than a predetermined value after the service end determining unit 91 has determined that a passenger of the vehicle 1 has approved of end of the mobility service, the vehicle control unit 92 may cause the vehicle 1 to depart from the drop-off point. In this case, the distance between the passenger having exited the vehicle 1 and the vehicle 1 is detected by communication between the vehicle 1 and the mobile terminal 3 or by the surrounding information detecting device 81.

The above-mentioned embodiments can be put into practice in arbitrary combinations. For example, the fourth embodiment may be combined with the second embodiment or the third embodiment. When the fourth embodiment is combined with the second embodiment, Steps S204 and S205 in FIG. 7 are performed between Steps S403 and S404 in the control routine of the service ending process illustrated in FIG. 11. When the fourth embodiment is combined with the third embodiment, Steps S304 to S306 in FIG. 9 are performed between Steps S403 and S404 in the control routine of the service ending process illustrated in FIG. 11. In this case, when the service end determining unit 91 has determined that the passenger of the vehicle 1 has approved of end of the mobility service, the lost article checking unit 93 has determined that checking of a lost article has ended, and departure of the vehicle 1 has been approved of by all the requesters remaining in the vehicle 1, the departure determining unit 94 permits departure of the vehicle 1.

What is claimed is:

1. A vehicle configured to provide a mobility service of transporting a passenger by autonomous traveling, the vehicle comprising:
   a gesture detecting unit configured to detect a person's gesture outside the vehicle;
   a service end determining unit configured to determine whether the passenger has approved of an end of the mobility service,
   wherein the service end determining unit determines that the passenger has approved of the end of the mobility service when the gesture detecting device has detected a specific gesture while the vehicle is stopped; and
   a departure determining unit configured to determine whether departure of the vehicle is possible,
   wherein the departure determining unit is configured to permit departure of the vehicle when some of a plurality of users having requested use of the mobility service has exited the vehicle, the service ending determining unit has determined that the passenger has approved of the end of the mobility service, and all the users having requested use of the mobility service and remaining in the vehicle have approved of departure of the vehicle.

2. The vehicle according to claim 1, wherein the specific gesture is set to a gesture using a leg or a head.

3. The vehicle according to claim 1, wherein the service end determining unit is configured to determine that the passenger has approved of the end of the mobility service when the specific gesture has been detected by the gesture detecting unit after a door of the vehicle has been opened and closed.

4. The vehicle according to claim 1, wherein the service end determining unit is configured to determine that the passenger has approved of the end of the mobility service when the specific gesture of a user who has requested use of the mobility service has been detected by the gesture detecting unit.

5. The vehicle according to claim 1, further comprising a lost article checking unit configured to inquire of the passenger about whether there is a lost article when the service end determining unit has determined that the passenger has approved of the end of the mobility service.

6. The vehicle according to claim 5, further comprising an object detecting unit configured to detect a person and an object in the vehicle,
wherein the lost article checking unit is configured to cause the passenger to check whether there is a lost article when the service end determining unit has determined that the passenger has approved of the end of the mobility service and the object detecting unit has detected a person or an object in the vehicle.

7. The vehicle according to claim 5, wherein the lost article checking unit is configured to determine that checking of a lost article by the passenger has ended when the specific gesture has been detected by the gesture detecting unit.

8. The vehicle according to claim 1, wherein the service end determining unit is configured to notify the passenger of the specific gesture (1) when the vehicle has arrived at a drop-off point or (2) when the vehicle is within a predetermined time or a predetermined distance until the vehicle arrives at the drop-off point.

9. The vehicle according to claim 8, wherein the service end determining unit is configured to change the specific gesture when the passenger is notified of the specific gesture.

10. A vehicle configured to provide a mobility service of transporting a passenger by autonomous traveling, the vehicle comprising:
a gesture detecting unit configured to detect a person's gesture outside the vehicle;
a service end determining unit configured to determine whether the passenger has approved of an end of the mobility service,
wherein the service end determining unit determines that the passenger has approved of the end of the mobility service when the gesture detecting device has detected a specific gesture while the vehicle is stopped, and
a vehicle control unit configured to control the vehicle,
wherein the vehicle control unit is configured to cause the vehicle to depart when the service end determining unit has determined that the passenger has approved of the end of the mobility service.

11. The vehicle according to claim 10, wherein the specific gesture is set to a gesture using a leg or a head.

12. The vehicle according to claim 10, wherein the service end determining unit is configured to determine that the passenger has approved of the end of the mobility service when the specific gesture has been detected by the gesture detecting unit after a door of the vehicle has been opened and closed.

13. The vehicle according to claim 10, wherein the service end determining unit is configured to determine that the passenger has approved of the end of the mobility service when the specific gesture of a user who has requested use of the mobility service has been detected by the gesture detecting unit.

14. The vehicle according to claim 10, further comprising a lost article checking unit configured to inquire of the passenger about whether there is a lost article when the service end determining unit has determined that the passenger has approved of the end of the mobility service.

15. The vehicle according to claim 14, further comprising an object detecting unit configured to detect a person and an object in the vehicle,
wherein the lost article checking unit is configured to cause the passenger to check whether there is a lost article when the service end determining unit has determined that the passenger has approved of the end of the mobility service and the object detecting unit has detected a person or an object in the vehicle.

16. The vehicle according to claim 14, wherein the lost article checking unit is configured to determine that checking of a lost article by the passenger has ended when the specific gesture has been detected by the gesture detecting unit.

17. The vehicle according to claim 10, wherein the service end determining unit is configured to notify the passenger of the specific gesture (1) when the vehicle has arrived at a drop-off point or (2) when the vehicle is within a predetermined time or a predetermined distance until the vehicle arrives at the drop-off.

18. The vehicle according to claim 17, wherein the service end determining unit is configured to change the specific gesture when the passenger is notified of the specific gesture.

19. The vehicle according to claim 10, wherein the vehicle control unit is configured to cause the vehicle to depart when a specific gesture of the passenger has been detected.

20. The vehicle according to claim 19, wherein the vehicle control unit is configured to cause the vehicle to depart when a specific gesture of the passenger has been detected while the passenger is outside of the vehicle and the vehicle is stopped.

* * * * *